(12) United States Patent
Mangal

(10) Patent No.: US 8,060,068 B1
(45) Date of Patent: *Nov. 15, 2011

(54) INTERACTIVE MOBILE CALLER-IDENTIFICATION INFORMATION ON A TELEVISION

(75) Inventor: Manish Mangal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 985 days.

This patent is subject to a terminal disclaimer.

(21) Appl. No.: 11/870,112

(22) Filed: Oct. 10, 2007

(51) Int. Cl.
*H04M 3/42* (2006.01)
*H04M 3/00* (2006.01)

(52) U.S. Cl. .................... 455/415; 455/417; 455/420

(58) Field of Classification Search ............. 455/3.06, 455/422.1, 426.1, 456.1, 456.3, 466, 556.1, 455/557, 563, 415–420; 379/142.01, 142.04, 379/93.23, 142.06–142.07, 142.1, 142.15–142.17; 348/14.02, 14.07; 725/34, 106, 110, 117, 725/131, 147, 139, 35, 40, 62, 122, 151, 725/153
See application file for complete search history.

(56) References Cited

U.S. PATENT DOCUMENTS

| 5,825,862 | A  | * | 10/1998 | Voit et al. ................. 379/142.16 |
| 5,920,806 | A  | * | 7/1999  | Gouessant ................... 455/557 |
| 6,760,415 | B2 | * | 7/2004  | Beecroft .................. 379/110.01 |
| 6,831,969 | B2 | * | 12/2004 | Ju ........................... 379/142.16 |
| 7,197,321 | B2 | * | 3/2007  | Erskine et al. ............. 455/456.1 |
| 7,266,834 | B1 | * | 9/2007  | Lund et al. ...................... 725/47 |
| 7,286,799 | B2 | * | 10/2007 | Thrasher ..................... 455/41.2 |
| 7,333,820 | B2 |   | 2/2008  | Sheha et al. |
| 7,536,177 | B2 | * | 5/2009  | Karaoguz et al. ............. 455/415 |
| 7,664,239 | B2 | * | 2/2010  | Groff et al. ................. 379/93.17 |
| 2003/0016804 | A1 |   | 1/2003 | Sheha et al. |
| 2003/0138083 | A1 | * | 7/2003 | Corbett et al. ............. 379/93.23 |
| 2003/0190024 | A1 | * | 10/2003 | Ju ............................ 379/142.16 |
| 2003/0194078 | A1 |   | 10/2003 | Wood et al. |
| 2004/0091090 | A1 | * | 5/2004  | Hong et al. ............... 379/102.03 |
| 2004/0203835 | A1 | * | 10/2004 | Trottier et al. ................. 455/454 |
| 2005/0262542 | A1 | * | 11/2005 | DeWeese et al. ............. 725/106 |
| 2006/0025159 | A1 | * | 2/2006  | Estevez et al. ............. 455/456.3 |
| 2006/0088149 | A1 | * | 4/2006  | Sung ........................ 379/142.16 |
| 2006/0166657 | A1 |   | 7/2006  | Patel |
| 2006/0222152 | A1 |   | 10/2006 | Elias et al. |
| 2007/0036313 | A1 | * | 2/2007  | White et al. ............. 379/142.17 |
| 2007/0182546 | A1 | * | 8/2007  | Virk et al. ................. 340/539.13 |
| 2007/0250884 | A1 | * | 10/2007 | Qiu et al. ..................... 725/106 |
| 2007/0263808 | A1 | * | 11/2007 | Van Wyk et al. .......... 379/142.01 |

(Continued)

OTHER PUBLICATIONS

Time Warner Cable, "Caller ID on TV: Just one more reason to love Digital Phone," http://www.timewarnercable.com/austin/products/digitalphones/callerid.html, Jul. 2007.

(Continued)

Primary Examiner — Brandon Miller

(57) ABSTRACT

A system and associated methods and media of delivering a notification of an incoming call and a series of interactive options such that a user can provide call-handling instructions to a wireless communications network for the incoming call. The notification and interactive options are transferred to a display device across at least a partially wired network. The indication and caller-identification information is inserted into a video stream that is communicated from the video-providing component to a media-receiving device that is in communication with a display device. The video-providing component receives call-handling instructions from the media-receiving device, as selected by a user, regarding the incoming call and then transmits the call-handling instructions to the wireless communications network.

3 Claims, 12 Drawing Sheets

U.S. PATENT DOCUMENTS

2008/0125098 A1* 5/2008 Bruce et al. ................ 455/414.1
2008/0141302 A1 6/2008 Ota
2009/0025028 A1 1/2009 Cassanova et al.

OTHER PUBLICATIONS

Office Action in U.S. Appl. No. 11/870,470 mailed Sep. 21, 2010.
Robuck, Mike, "Survey Says: Bring Converged Services," Internet Article, Oct. 2, 2006, 2 pages, Publisher-Cable360.net, http://www.cable360.net/ct/video/20019.html.
Van Dusseldorp & Partners, "UK Firm Puts Texts Messages on TV," Publication: EuropeMedia, Jun. 21, 2002, 4 pages, http://www.allbusiness.com/technology/technology-services/204759-1.html.
Office Action in U.S. Appl. No. 11/687,791 mailed Sep. 2, 2010.
Office Action mailed Dec. 15, 2010 in U.S. Appl. No. 11/870,112.
Office Action mailed Dec. 16, 2010 in U.S. Appl. No. 11/870,470.
Final Office Action mailed Feb. 17, 2011 in U.S. Appl. No. 11/687,791.
Office Action mailed Feb. 25, 2011 in U.S. Appl. No. 11/870,470.

* cited by examiner

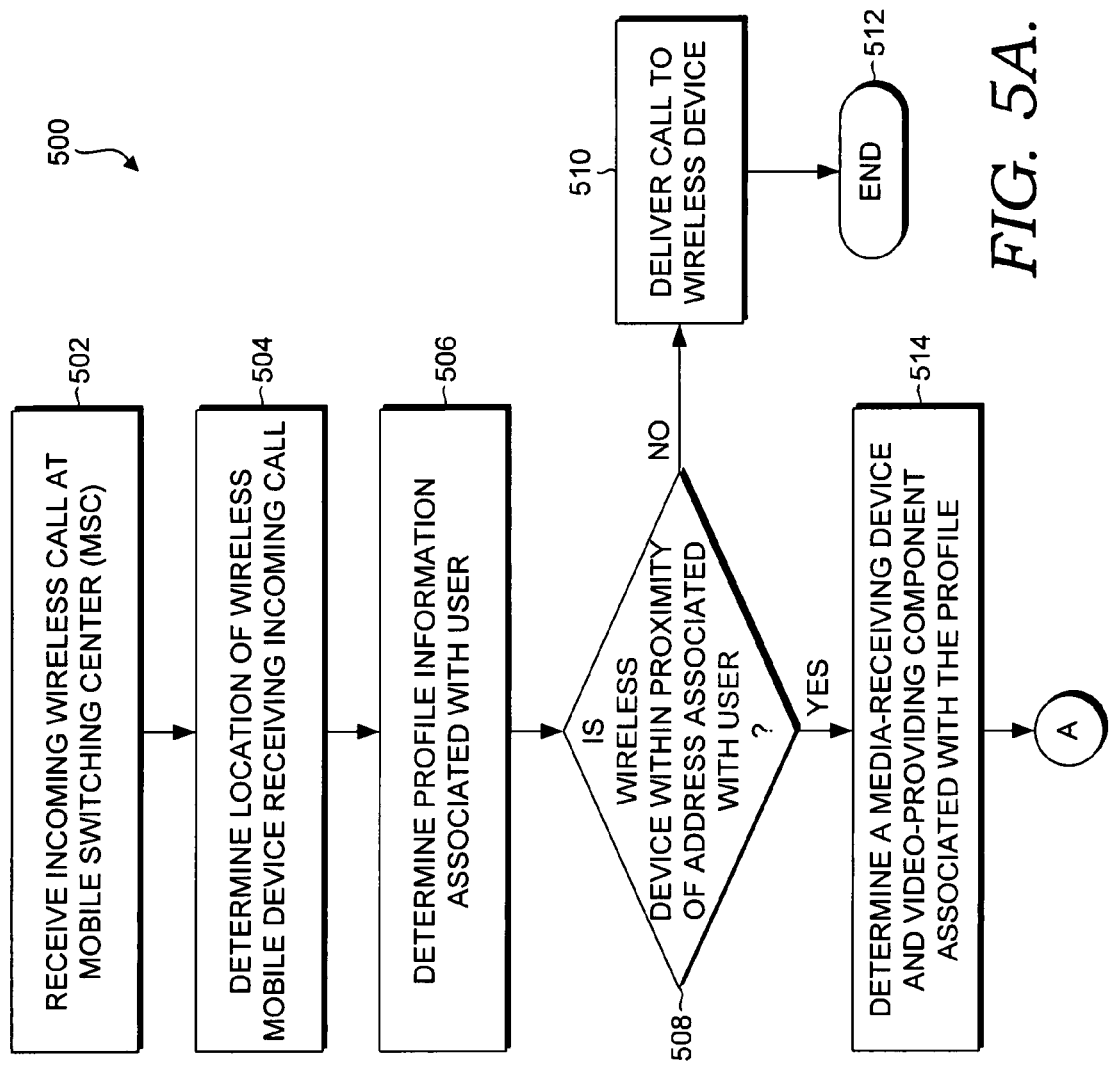

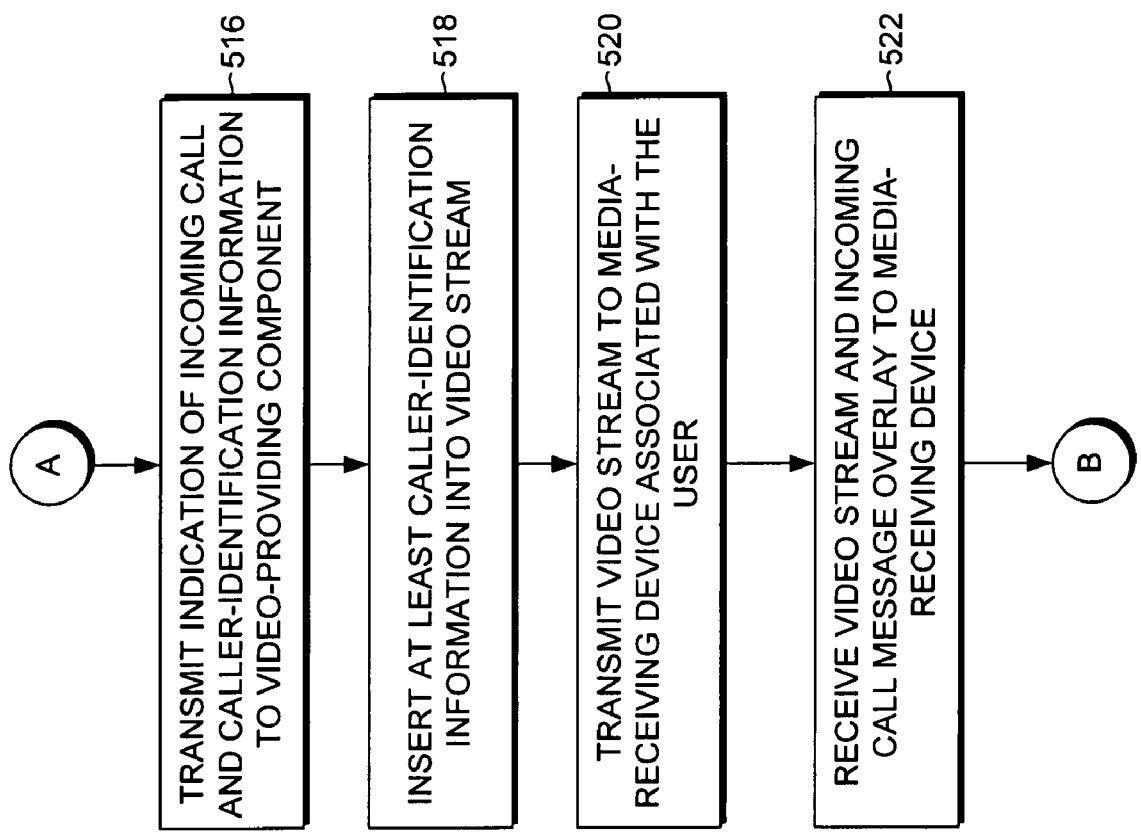

INTERACTIVE MOBILE CALLER-IDENTIFICATION INFORMATION ON A TELEVISION

BRIEF SUMMARY

The invention is defined by the claims below, not by this Summary, which is provided to introduce a selection of concepts in a simplified form that are further described below in the Detailed Description.

The system and methods embodied herein facilitate the delivery of Caller ID information directed to a user's mobile phone (including PDA, and the like) onto the user's home television set for viewing. In particular, the Caller ID information is routed to a particular user's video provider for delivery to the user's home television based on whether a "home" condition is currently valid for the particular user. In such a case, current information about the mobile phone location is utilized to determine if there is an increased probability that the user is at home to view the Caller ID information on their home television.

In one aspect, a method is set forth for selectively providing to a video provider information regarding an incoming call destined for and based on the location of a designated mobile phone associated with a particular user, thereby enabling the video provider to insert the information regarding the incoming call into a video stream for delivery to a video display device associated with the particular user. According to the method, a mobile switching center receives a call from a calling phone, which contains information regarding an identification of the calling phone and a destination number associated with a designated mobile phone. Thereafter, a determination is made as to whether designated mobile phone is within a home zone for the particular user. If in fact the designated mobile phone is determined to be within the home zone, then the calling phone identification and the mobile phone destination number are sent to a video provider associated with the particular user. The video provider can then insert the calling phone identification into the video stream being delivered to the particular user's display device (e.g., the user's home television).

In an alternate embodiment, a way is disclosed for presenting a user of a display device with caller-identification information associated with an incoming call to the user's wireless mobile device across a wireless communications network and prompting the user for call-handling instructions. In this embodiment, a data store in the wireless communications network is consulted to determine the user's profile information, specifically details about a video provider and a media-receiving device. When the wireless mobile device is within a proximity of a physical address associated with the user's profile, then an indication of an incoming call is shown on a display device associated with the user as well as on the wireless mobile device. This call information is transferred to the display device across a network, in which at least a portion of the network is wired.

In yet another embodiment, a way is provided for transmitting call information associated with an incoming call to a wireless mobile device between a video-providing component and the user of a display device that is in communication with the video-providing component. The indication and caller-identification information is inserted into a video stream that is transmitted from the video-providing component to a media-receiving device. The video-providing component receives call-handling instructions from the media-receiving device regarding the incoming call and then transmits the call-handling instructions to the wireless communications network.

In yet a further embodiment, a way is disclosed for presenting to the user of a display device caller-identification information and interactive options for processing an incoming call to a wireless mobile device. A video stream and incoming call message is received from a video-providing component to a media-receiving device and this information, along with interactive options is shown to a user on a display device. A response regarding the incoming call message is received from the user and communicated to the video-providing component thereby removing the incoming call message from the display device.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

Embodiments of the present invention are described in detail below with reference to the attached drawing figures which are incorporated by reference, and wherein:

FIGS. 5A, 5B, 5C, and 5D are flow diagrams representative of methods for delivering to a display device caller-identification information of an incoming call to a user's wireless mobile device according to an embodiment of the present invention;

DETAILED DESCRIPTION

The subject matter of embodiments of the present invention are described with specificity herein to meet statutory requirements. Although the terms "step" and/or "block" may be used herein to connote different components of methods employed, the terms should not be interpreted as implying any particular order among or between various steps herein disclosed unless and except when the order of individual steps is explicitly described.

Exemplary Operating Environment

Figure 1:
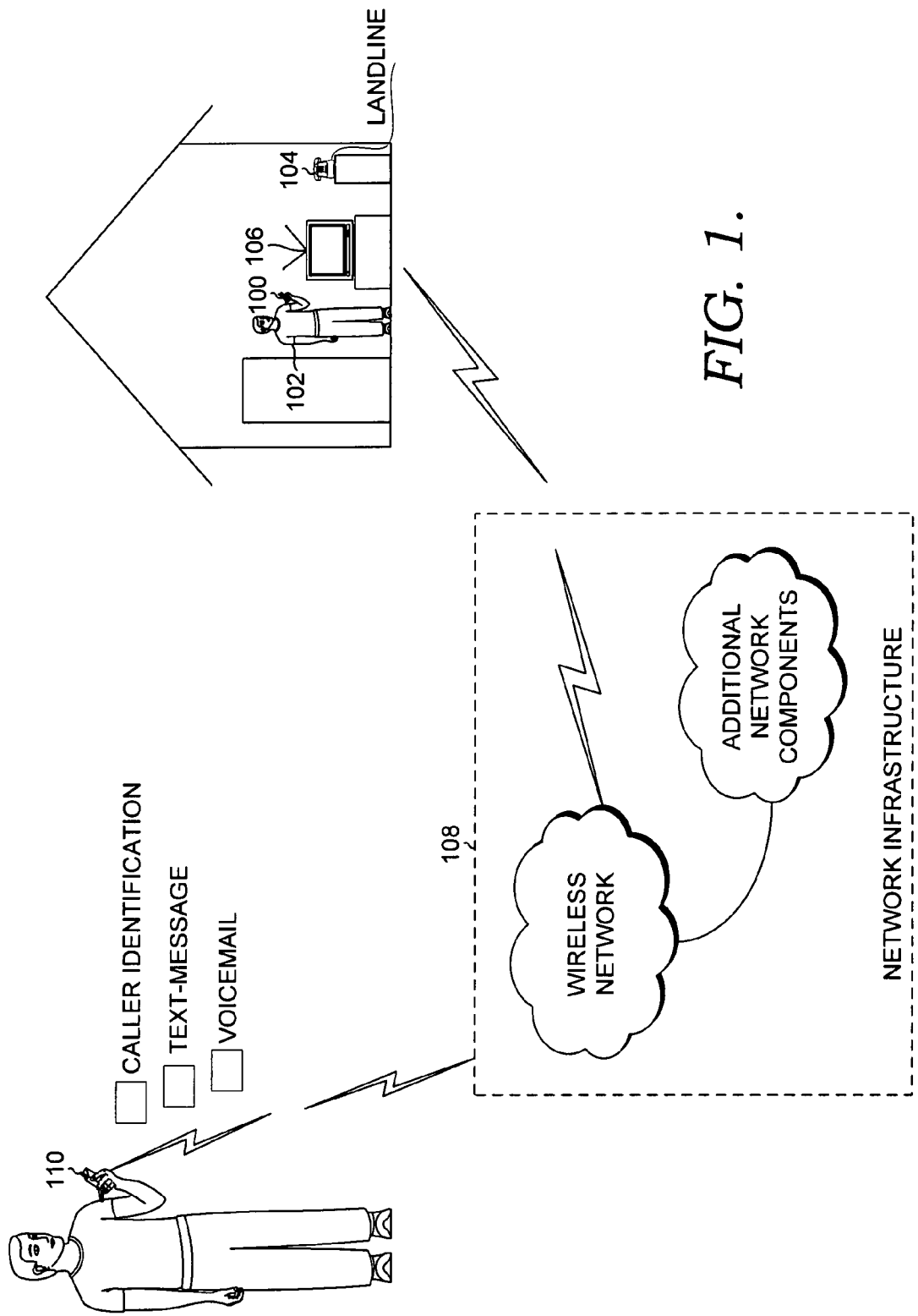
FIG. 1 depicts an environment suitable for use in implementing an embodiment of the present invention.

Referring initially to FIG. 1 in particular, an environment for implementing an embodiment of the present invention is shown. Embodiments of the present invention are directed towards a wireless mobile device 100 and maintaining communication with the user 102 of the wireless mobile device 100 when the device is not immediately within reach of the user 102. In FIG. 1 a user 102 also has access to a landline telephone 104 and a display device 106, such as a television.

The wireless mobile device 100 is in communication with a network infrastructure 108 and uses this infrastructure to communicate with other wireless mobile devices 110. The wireless mobile device 100 can also communicate with the landline telephone 104 or any other landline telephone. Examples of data that can be transmitted across the network infrastructure 108 include caller-identification information, text-message data, and voicemail data. More specific operation will be discussed in detail below.

Figure 2:
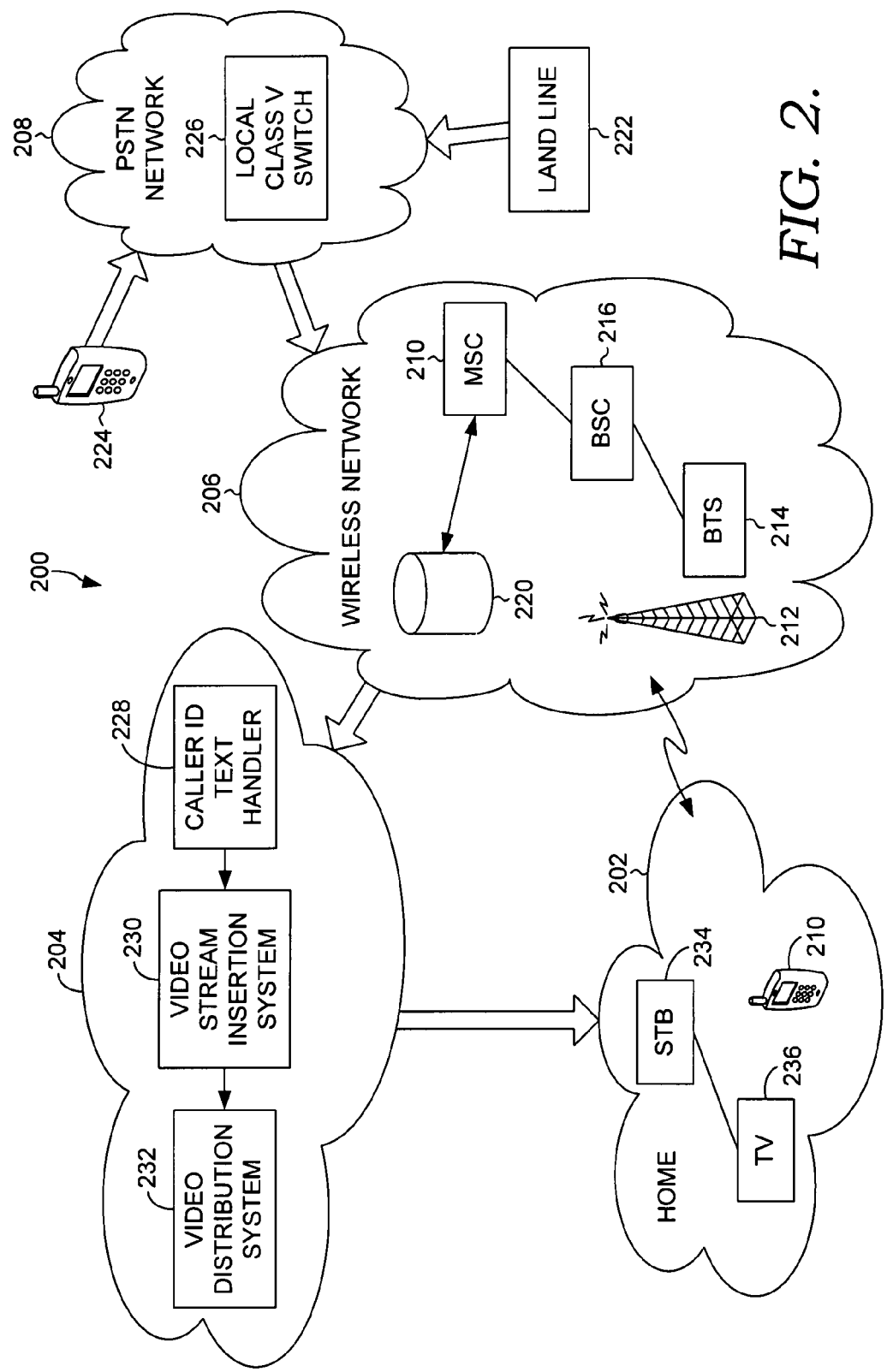
FIG. 2 depicts a system for delivering calling-phone identification information destined for a particular user's mobile phone to the user's home television according to an embodiment of the present invention.

Turning now to FIG. 2, a Caller ID handling system 200 is illustrated for directing calling phone identification information destined for a particular user's mobile phone to the user's home television. Different portions of the system 200 handling certain functions specified herein include a home portion 202, a video provider portion 204, a telecommunications wireless network portion 206 and a public switched telephone network (PSTN) portion 208.

A particular user's mobile phone 210 is illustrated as being within or at the user's home (residence/dwelling place) in FIG. 2, though it should understood that the mobile phone 210 could be in another location, thereby affecting the outcome of certain activities carried out by an embodiment of the present invention, as explained herein. The boundary of the home portion 202, or "home zone," is explained in further detail herein, but essentially encompasses a region recognized by the system 200 as being associated with the user's physical home or some similar limiting spatial factor. As is known in the art, in a wireless network (such as portion 206), mobile phone 210 sends and receives radio signals through a cell tower 212 having a base transceiver system (BTS) 214, a number of which are typically connected to a base station controller (BSC) 216. The BSC 216 manages the communication between a number of BTSs 214 and a limited number of mobile phones compatible with the wireless network. The BSC 216 connects to a mobile switching center (MSC) 218 acting as a telephone exchange to handle the mobile phone activity through the associated one or more BSCs 216 while connecting as needed to the public switched telephone network (such as PSTN portion 208).

Database 220 is utilized by the MSC 218 to determine current "presence" information for mobile phone 210 users. As explained in further detail herein, one way to establish the user's presence as "home" presence is to determine if the user's mobile phone 210 is currently (or very recently) in communication with the user's assigned home MSC, which is the MSC 218 selected to be geographically closest to the user home or other preestablished location when the user established a home location with a particular wireless telecommunications carrier. The gateway MSC is the MSC 218 that interfaces with the PSTN portion 208, and also determines the MSC assigned to handle a call to the user's mobile phone 210 based on the current location of the user (whether or not it is in fact the home MSC).

PSTN portion 208 handles both land line calls 222 and wireless calls 224 that have reached the PSTN through a wireless network. For instance, incoming calls to the PSTN portion 208 are handled through a local class V switch 226, or equivalent (in hardware or software). Nevertheless, it should be understood that PSTN portion 208 may provide both a circuit-switched network and a packet-switched network, such as for handling some portion of a voice over internet protocol (VoIP) call.

Video provider portion 204 includes a Caller ID text handler 228 for receiving calling-phone identification information from the wireless network portion 206 (which may be routed through another network along the way, such as the PSTN portion 208), a video stream insertion system 230 for taking the calling-phone identification information and inserting the information as data embedded in a video feed or stream being assembled (e.g., as a data packet or "tag" data), and a video distribution system 232 which transmits the assembled video stream to the designated end user's set top box (STB) 234 connected with their home television 236. It should be understood that video streams often include additional types of media, such as audio content. Further, in the context of an embodiment of the present invention, the term "television" refers to any video display device that may be located at a preestablished destination point that the user has conveyed to the video content provider, referred to as the user's "home". In other words, the home television 236 may encompass a traditional television set, a computer with a monitor connected with the STB 234, or any other similar device. Moreover, the functions of a set top box in receiving video streams and handling the associated content for delivery to the home television 236 (e.g., decompressing/demultiplexing the video stream) may be integrated into the home television 236, such that the STB 234 is not a separate device.

As referred to above, the system 200 works to provide Caller ID information destined for a particular user's mobile phone to the user's home television 236 when it is believed that the user is likely home to view it on the television 206. To do this, the MSC 218 determines the presence condition for the user (more particularly, for the user's designated mobile phone 210). This may be done in a number of ways. As one example, if the database 220 has logged quite recently (e.g., in the past few minutes, or sooner) that the mobile phone 210 is in direct communication with the user's home MSC 218, then it is reasonably likely that the user is within or close to their designated home zone. In other words, if the respective BTSs 214 connected with the home MSC 218 are receiving radio signals from the user's mobile phone 210, then the user is considered to be in the "home zone". As a result, there would be at least a considerable chance that the user would be at home to view any Caller ID information on their home television 236 for calls attempting to reach the user's mobile phone 210. The database 220 would then log a "home" condition.

Alternatively, the database 220 (through the MSC 218) could log the GPS coordinates of the mobile phone 210 and periodically compare the coordinates with a preestablished GPS location for the user's home in situations where the mobile phone 210 has a GPS receiver and transmits the determined geolocation to the MSC 218. Upon a match between the coordinates, the database 220 would log the "home" condition. Still further, the wireless network portion 206 could utilize triangulation techniques via a number of BTSs 214 connected with the MSC 218 through the particular BSC 216, to determine a location for the mobile phone 210 (because the location of the cell towers associated with each BTS 214 are known). This would substitute for the GPS coordinates, but otherwise the determination of the "home" condition could be conducted in the same way. It should also be understood that the home MSC 218 for the particular user could store the "home" or "not home" condition in cached memory, to be quickly recalled when the home MSC learns from the gateway MSC that a call is being attempted to user's mobile phone 210 (i.e., for one of the user's associated with the particular MSC.) In any case, the presence condition cached or stored in the database 220 may be determined periodically (e.g., every few seconds, or minutes) in order to save system resources over trying to determine and the presence condition continuously (e.g., every few milliseconds).

Figure 3:
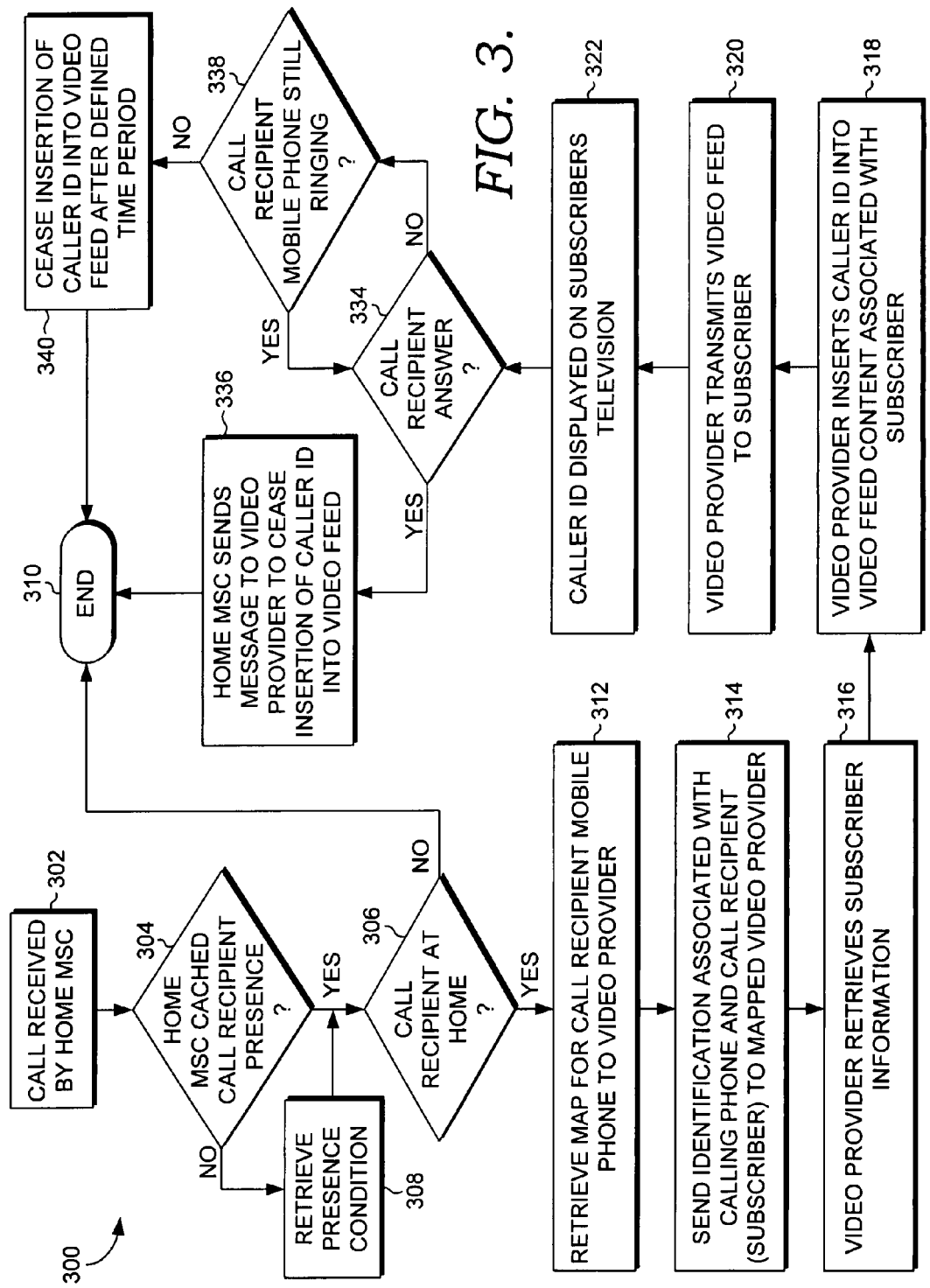
FIG. 3 is a flow diagram representative of a method for delivering calling phone identification information destined for a particular user's mobile phone to the user's home television according to an embodiment of the present invention.

Continuing with FIG. 3, one method 300 of implementing the features of the system 200 to accomplish delivery of calling phone identification information destined for a particular user's mobile phone to the user's home television is depicted. It should be understood that prior to implementing the method 300, the user has designated for the wireless network the identity of the user's video provider, such that the wireless network portion 206 knows to communicate the mobile phone 210 user identity and the calling phone identification information (Caller ID) to a particular video content provider chosen by the user.

At a first step 302 of the method 300, a call is received by the home MSC 218 for the particular mobile phone 210 user. As shown in FIG. 2, the call comes across the PSTN portion 208 from a land line phone or a wireless or mobile phone (or a computer modem acting as a phone for a VoIP call, etc.). The call first reaches the gateway MSC, which contacts the home MSC 218.

A determination is then made in step 304 as to whether the home MSC 218 has cached the call recipient's (i.e., the mobile phone 210 user's) presence condition. If so, then in step 306 the MSC 218 inquires as to whether the call recipient has been recently designated as being home or within the "home zone". Otherwise, if the home MSC 218 has not cached the call recipient's, then in step 308, the MSC 218 retrieves the presence condition from the database 220, and the method continues at step 306.

Returning to step 306, if the call recipient is not at home (i.e., the "not home" condition is currently valid), then there is no need to send the Caller ID information to the user's home television, and thus the method 300 concludes at step 310. Alternatively, if the call recipient is at home (i.e., the "home" condition is currently valid), then in step 312 the "map" or relational chart providing the link between the user's mobile phone number and the video provider associated with that particular user (the user as a subscriber of the video provider's content) is retrieved. This is possible because the incoming call contained the destination number the caller is trying to reach, which is the user's mobile phone number.

Having the mobile phone number to video content provider map, then in step 314, the calling-phone identification information and the user's mobile phone number are sent to the particular video provider (i.e., video provider portion 204). As can be understood, because the video provider has already been furnished with the user's mobile phone number sometime in the past (through authorization of the wireless network to furnish information associated with handled calls to the video provider), the video provider can easily look up the identity of the particular user to receive video content based on the mobile phone number of the same user. Accordingly, in step 316, the video provider portion 204 retrieves the subscriber information, and then in step 318, inserts the calling phone identification information (or Caller ID) into the video feed content associated with the subscriber/user. In step 320, the video provider transmits or "streams" the video feed to the user at the home portion 202. Finally, in step 322, the Caller ID information is displayed on the mobile phone 210 user's home television 236.

Upon displaying the caller ID information on the user's home television 236, it is determined whether the user, as the call recipient, has answered the call on their mobile phone 210 in step 334. Based on the activity surrounding the setup and actual connection of a voice channel for a call, the home MSC 218 is made aware of whether the call has been answered. If the call has in fact been answered, then in step 336, home MSC 218 sends a command message to the video provider portion 204 to cease insertion of the Caller ID into the video feed for distribution. Thereafter, the method 300 moves to conclusion at step 310.

On the other hand, if the call has not been answered, then it is further determined in step 338 whether the call recipient's mobile phone 210 continues to ring. If the mobile phone 210 continues to ring, then the method 300 returns to step 334 where a determination is made again as to whether the mobile phone 210 user has answered the call. If the call recipient's mobile phone 210 is no longer ringing and a call cannot be completed, then the home MSC 218 informs the video provider portion 204 of this condition in step 340, enabling the video stream insertion system 230 to cease insertion of the Caller ID information into the video feed within a defined period of time (e.g., immediately, after 2 additional seconds, etc.). From step 340, the method 300 moves to conclusion at step 310.

As an alternative, steps 334-340 may be omitted from the method 300 if there is no concern about whether the Caller ID information should be displayed based on the user actually answering their mobile phone 210. It may be desirable, for instance, to merely have display of the Caller ID information (from step 322) for a predetermined amount of time regardless of whether the user actually answer's their mobile phone 210, since the information displayed on the home television 236 typically would only last for a few seconds, and thus would not be very distracting when viewing media content on the television receiving the video feed.

Figure 4:
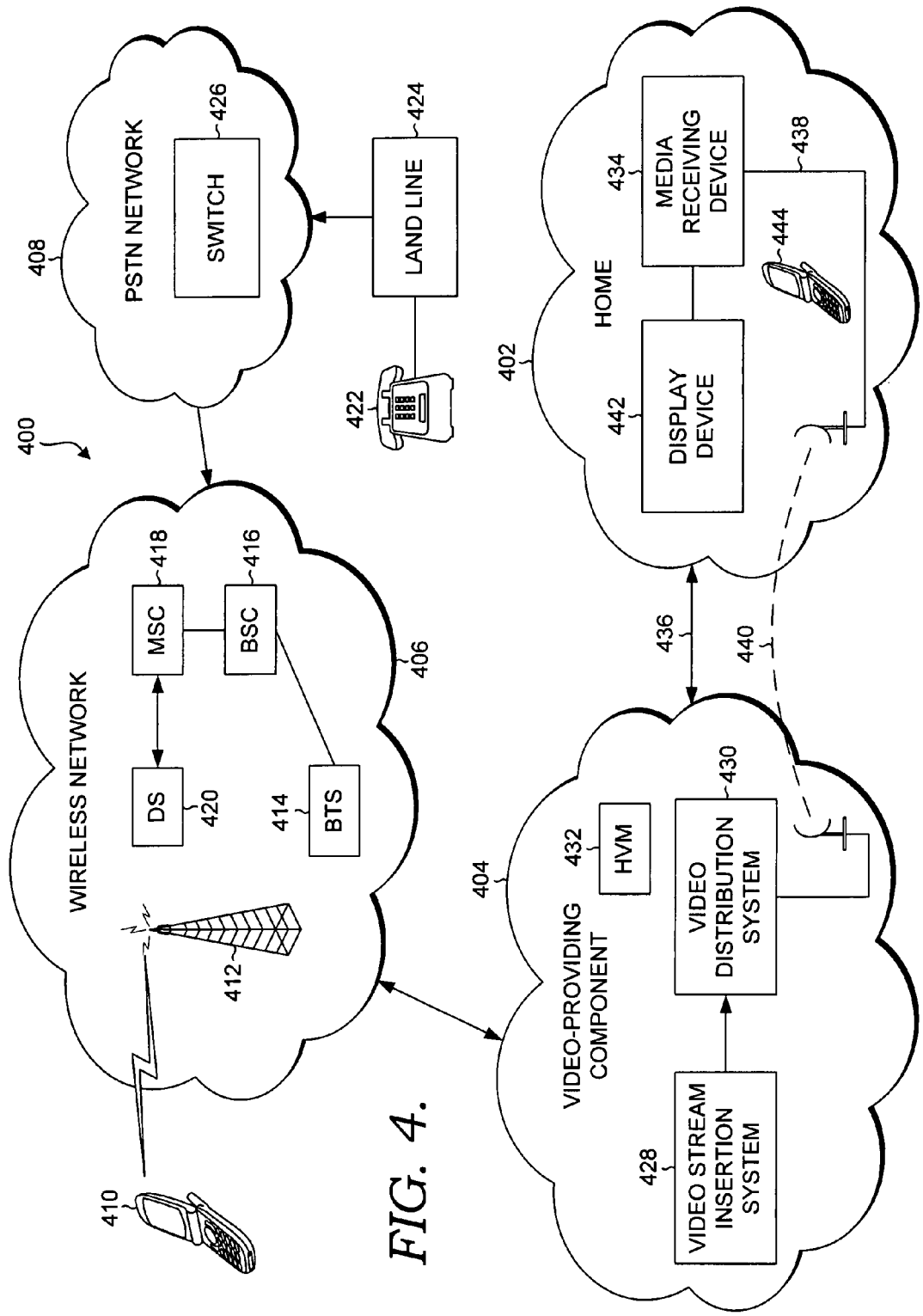
FIG. 4 depicts a system for delivering to a user's display device (such as a TV) an indication of an incoming call bound for a user's wireless mobile device according to an embodiment of the present invention.
Figure 5C:
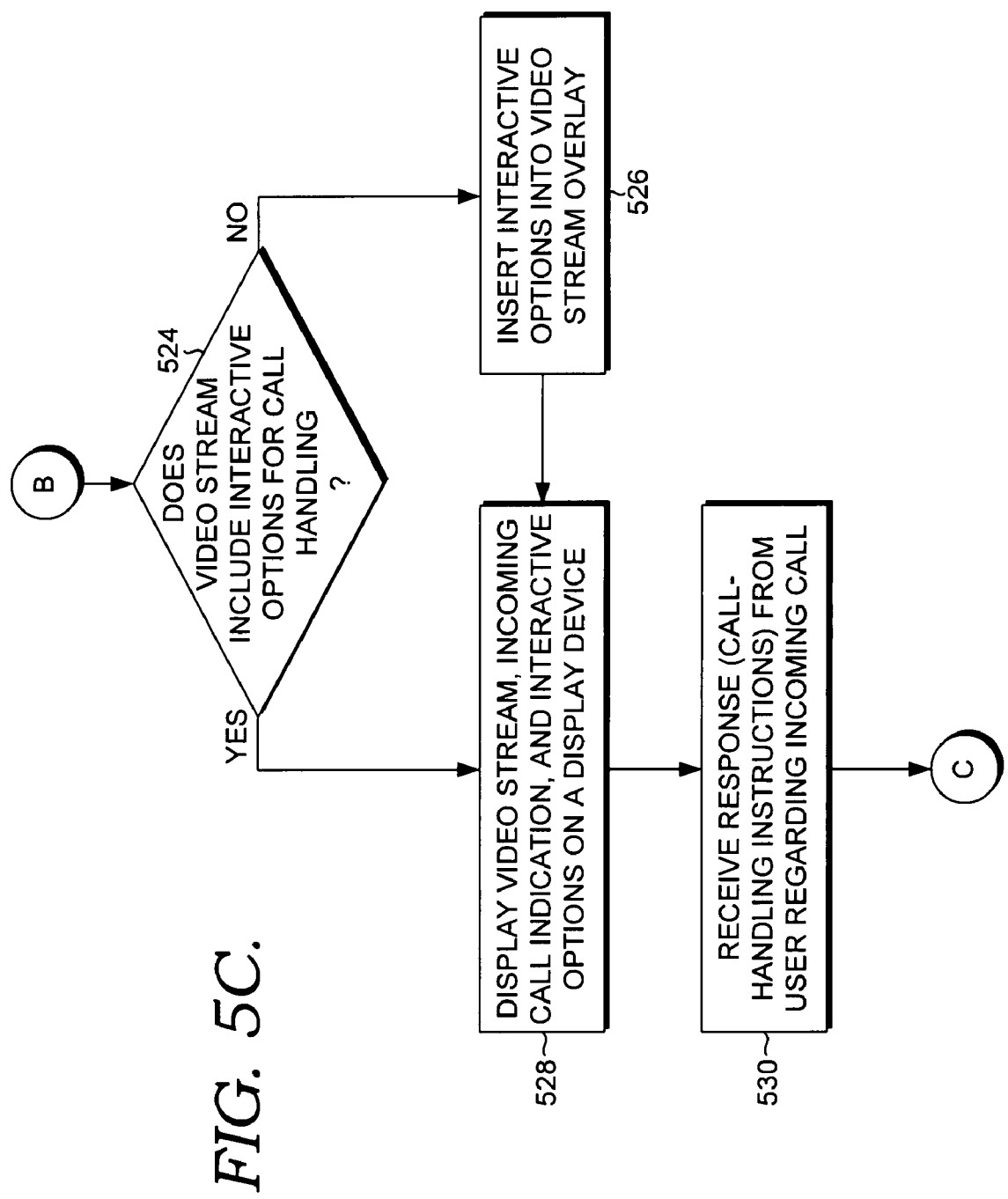
Figure 5D:
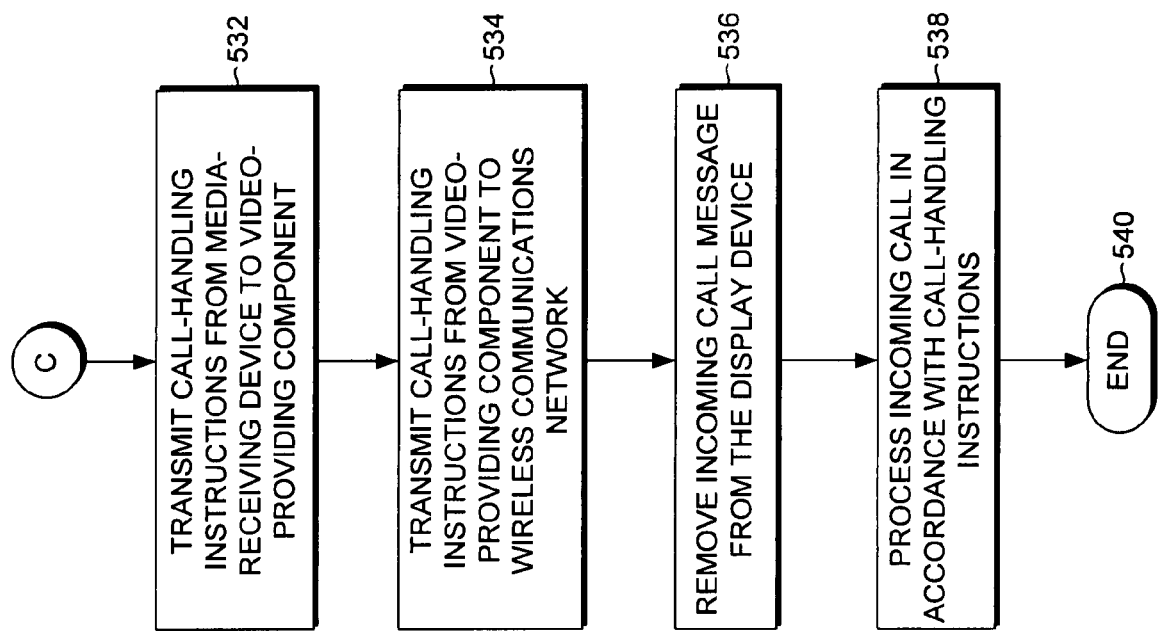

Referring now to FIG. 4, another embodiment of the present invention is depicted. A system 400 for transmitting caller-identification information and call-handling instructions is depicted. This system provides enhancements to the system depicted in FIG. 2 in that it permits a user to enter a response to an indication of an incoming call. The system 400 comprises a home portion 402, a video-providing component 404, a wireless communications network 406, and a public switched telephone network 408. FIG. 4 depicts two wireless mobile devices 410 and 444, with wireless mobile device 444 located within the home portion 402. The wireless mobile device 410 (and 444) sends and receives radio signals through at least one tower 412, having a base transceiver system (BTS) 414, which is typically connected to a base station controller (BSC) 416. The BSC 416 manages the communication between a number of BTS's 414 and a limited number of wireless mobile devices 410 (and 444) compatible with the wireless communications network 406. The BSC 416 connects to a mobile switching center (MSC) 418, which acts as a telephone exchange to handle wireless mobile device activity through the associated one or more BSC's 416, while connecting as needed to the public switched telephone network (such as PSTN 408).

The wireless communications network 406 further comprises a data store (DS) 420 that contains a set of profile information associated with each user of a wireless mobile device. The profile information in the DS 420 includes a name and address of an account for a user of a wireless mobile device, specifications of the wireless mobile device, video-providing component, and media-receiving device associated with the user.

The PSTN network 408 comprises a local switch 426 that is in selective communication with a land-based telephone 422 and a land line 424. The land-based telephone 422 can also direct a call to a wireless communications network 406.

The video-providing component 404, which, as an example can be a cable television provider or satellite television provider, comprises at least a video stream insertion system 428 that compiles video content that is to be distributed to viewers and a video distribution system 430. The video stream is transmitted to subscribers of the video-providing component 404 through a video distribution system 430. Often the video-providing component 404 also provides services to subscribers other than television-related programming. The video-providing component 404 can offer online services such as the Internet and telephone service. This telephone service can be traditional PSTN service as well as telephone service over the Internet, commonly referred to as voice over Internet protocol, or VoIP, and a corresponding home voicemail account (HVM) 432.

The video stream can be disseminated from the video-providing component 404 using different modes depending on the subscriber. For example, the video distribution system 430 can send the video stream across a cable network 436 to a media-receiving device 434 that is located within the home portion 402. Alternately, the video stream can be transmitted to the media-receiving device 434 across a partially non-wired pathway such as through a satellite dish system 440 and then across a cable network 438. Although the media-receiving device 434 is schematically shown as a separate component from a display device 442 in FIG. 4, it should be understood that the media-receiving device 434 could be incorporated within the display device 442. The media-receiving device 434 is a device capable of receiving at least video content for display to a user of a display device, such as a television, monitor, gaming system, or other device capable of displaying a video content.

Referring now to FIGS. 5A-5D, an embodiment of the present invention discloses a method of presenting to a user of a display device 442 caller-identification information that is associated with a wireless mobile device 444 that receives calls through a wireless communications network 406. The method 500 comprises a computer-readable media having computer-executable instructions where in a step 502 an incoming wireless call that is attempting to be established with a wireless mobile device 444 is received at a mobile switching center (MSC) 418. The incoming call also includes caller-identification information, such as a telephone number and possibly a user name associated with the incoming call. In a step 504, the location of the wireless mobile device 444 receiving the incoming call is determined. This location can be determined by a variety of ways such as through the use of a Global Positioning Satellite (GPS) system and corresponding GPS-receivable tag in the wireless mobile device 444 or through "pinging" the wireless mobile device 444 and determining the device location through triangulation from the closest towers 412 accessed by the wireless mobile device 444 in response to the "ping".

Once the physical location of the wireless mobile device 444 is determined, the profile information associated with the user of the wireless mobile device 444 is determined from the data store 420 in a step 506. As previously discussed, this profile information includes a user name and address, wireless mobile device specifications, a video-providing component, and a media-receiving device associated with the user. In a step 508, a determination is made as to whether or not the wireless mobile device 444 is located within a specified proximity of the address determined from the data store 420. The proximity may vary depending upon user specification, wireless communications network specifications, or the type of wireless mobile device. For example, a proximity may be set a certain distance from the user's address (e.g. 100 feet) to account for a situation in which the wireless mobile device is left in a car that is parked in the driveway or on the street. This proximity can also account for variations in the accuracy of the GPS or other position-determination systems.

If the wireless mobile device 444 is not found to be located within the specified proximity of the address in the user's profile information, then it is determined that the wireless mobile device 444 is not at the user's home portion 402. In a step 510, the incoming call is delivered to the wireless mobile device 444 without an indication of an incoming call being directed to the display device 442 associated with the user. The process then terminates at a step 512.

If, in the step 508, the wireless mobile device 444 is determined to be within the proximity of the user's address, then a video-providing component and media-receiving device are determined from the profile information for the user in a step 514. As previously discussed the video-providing component may be a cable television or satellite television provider or similar video-streaming entity. The user of a display device 442 is in communication with this provider by way of a media-receiving device 434. This media-receiving device 434 may be a set-top box for receiving a video stream to a television or monitor, but may also be an alternate device such as a modem or other device located within the display device 442.

In a step 516, the indication of an incoming call and respective caller-identification information is transmitted to the video-providing component 404 from the wireless network 406. In a step 518, the video-providing component inserts at least the caller-identification information into the video stream and in a step 520, the video-providing component 404 utilizes the video distribution system 430 to transmit the video stream to the media-receiving device 434. The video stream also includes an incoming call overlay in which the overlay includes at least caller-identification information. The transmission, whether by cable or satellite or other means, couples the media-receiving device 434 to the wireless communications network 406 by way of at least a portion of a cable network 436 and/or 438, which provides a wired pathway to the media-receiving device 434 for communicating the caller-identification information.

In a step 522, the video stream and incoming call message overlay are received by the media-receiving device 434. Depending on the circumstances, the interactive options may be inserted into the video stream by the media-receiving device 434 or the video-providing component 404. In a step 524, a determination is made as to whether or not the video stream includes interactive options for call handling.

If the interactive options are not transmitted with the video stream from the video-providing component 404, then according to a step 526, the interactive options are inserted into the video stream by the media-receiving device 434. The caller-identification information comprises at least a series of alphanumeric characters corresponding to at least a telephone number of the incoming call. The interactive options enable a user of the display device 442 to respond to the indication of the incoming call to the wireless mobile device 444. The interactive options provide call-handling instructions to the video-providing component 404 and the wireless communications network 406. Examples of call-handling instructions include directing the incoming call to a voicemail account associated with the wireless mobile device 444, to a voicemail account associated with a home-based telephone (HVM) 432, or directing the incoming call to an alternate telephone number.

In a step 528, the video stream, incoming call indication, and interactive options are shown on the display device 442. In a step 530, the media-receiving device 434 receives a response from the user in the form of selecting a set of call-handling instructions regarding the incoming call indication. The call-handling instructions are then transmitted from the media-receiving device 434 to the video-providing component 404 in a step 532. In a step 534, the call-handling instructions are transmitted from the video-providing component 404 to the wireless communications network 406.

In a step 536, the caller-identification information and interactive options from the incoming call message are removed from the display device. The removal of the caller-identification information can be completed from one of two locations, either the media-receiving device 434 or the video-providing component 404, depending upon where it was inserted into the video stream. The incoming call to the wireless mobile device is then processed in accordance with the call-handling instructions in a step 538 and the process terminates at a step 540. It is important to note that even while the call-identification information is being transmitted to the display device, the wireless communications network attempts to complete the call to the wireless mobile device.

In a variation to an embodiment of the present invention, the interactive options can be provided to the user audibly through a speaker in the display device 442. The audible speech can be generated by a speech module located in either the media-receiving device 434 or the display device 442. Furthermore, the call-handling instructions can be provided audibly by the user and, through a speech recognition module in the media-receiving device 434 or display device 442, are converted into computer-executable instructions understood by the video-providing component 404 and wireless communications network 406.

Figure 6:
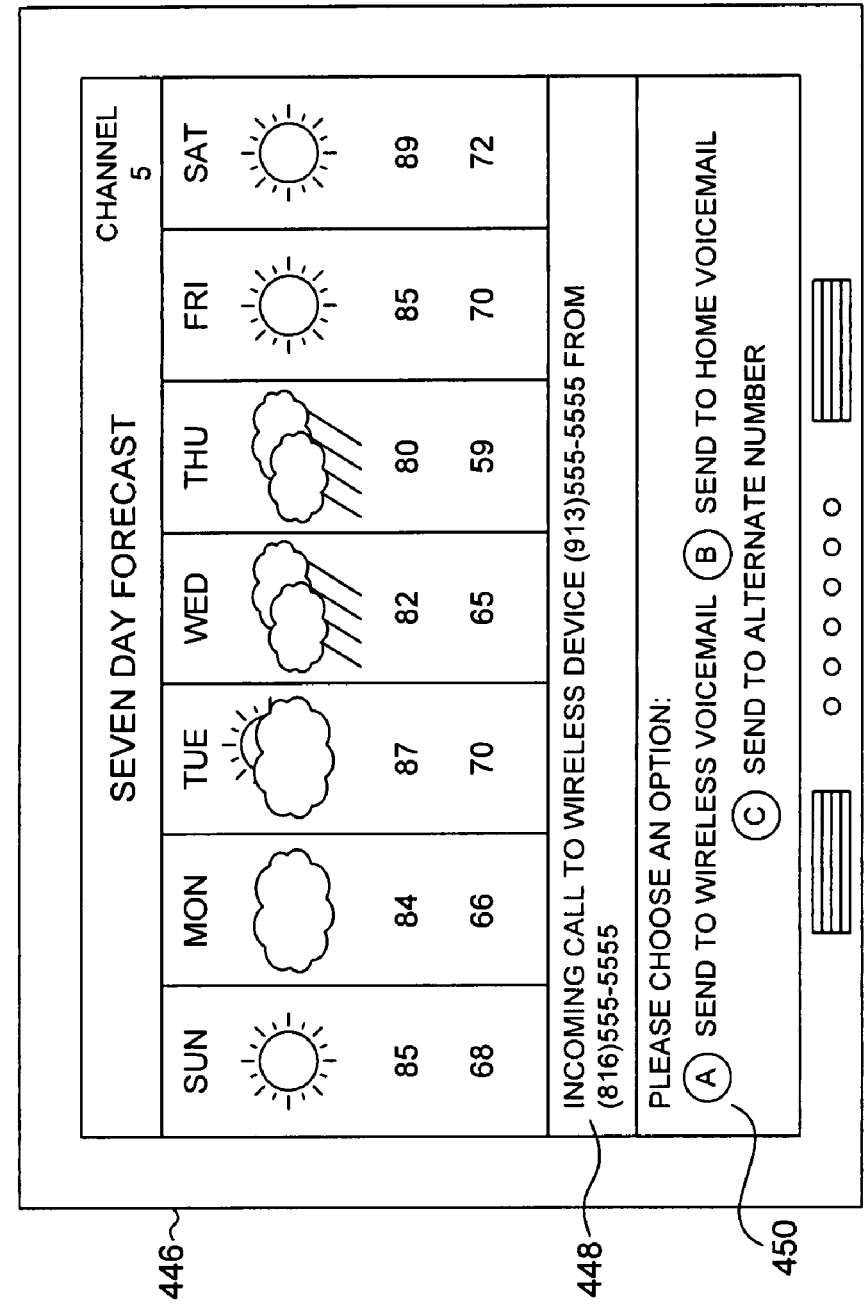
FIG. 6 is a depiction of a display device on which is depicted a video stream indicating an incoming call and providing a set of interactive options to a user according to an embodiment of the present invention.
Figure 7:
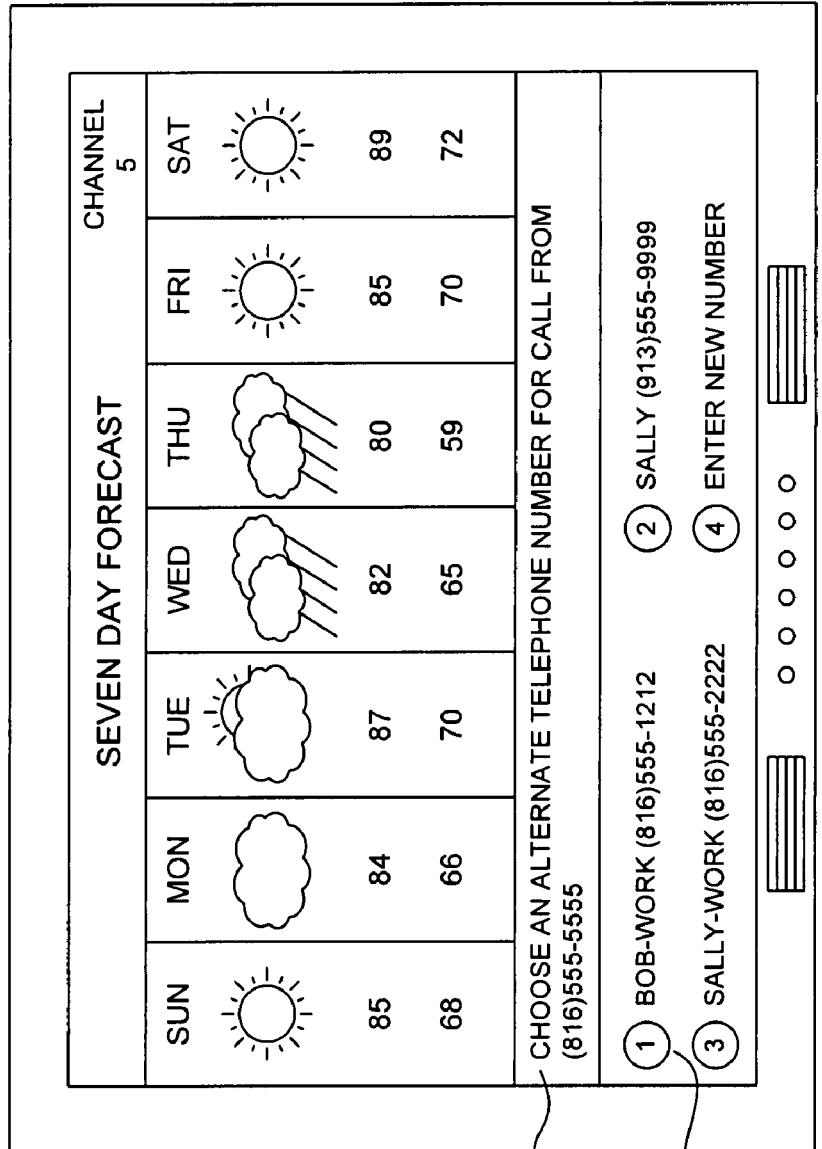
FIG. 7 is a depiction of a display device on which is depicted a video stream indicating an incoming call and providing an alternate set of interactive options to a user according to an embodiment of the present invention.

Referring now to FIGS. 6-9, a variety of display device screens 446 are depicted showing the incoming call indication and interactive options. Specifically, FIG. 6 depicts a display device 442 including an indication of an incoming call 448 and a series of interactive options 450 overlaid on a screen 446. For example, the indication of the incoming call 448 states that there is an incoming call to a wireless mobile device having the phone number (913) 555-5555 from the telephone number (816) 555-5555. Listed beneath the indication 448 is a series of interactive options 450. These options permit the user of the display device 442 to choose to A) send the incoming call to a voicemail account associated with the wireless device, B) send the incoming call to a voicemail account associated with the users home telephone, or C) send the incoming call to an alternate telephone number.

Figure 8:
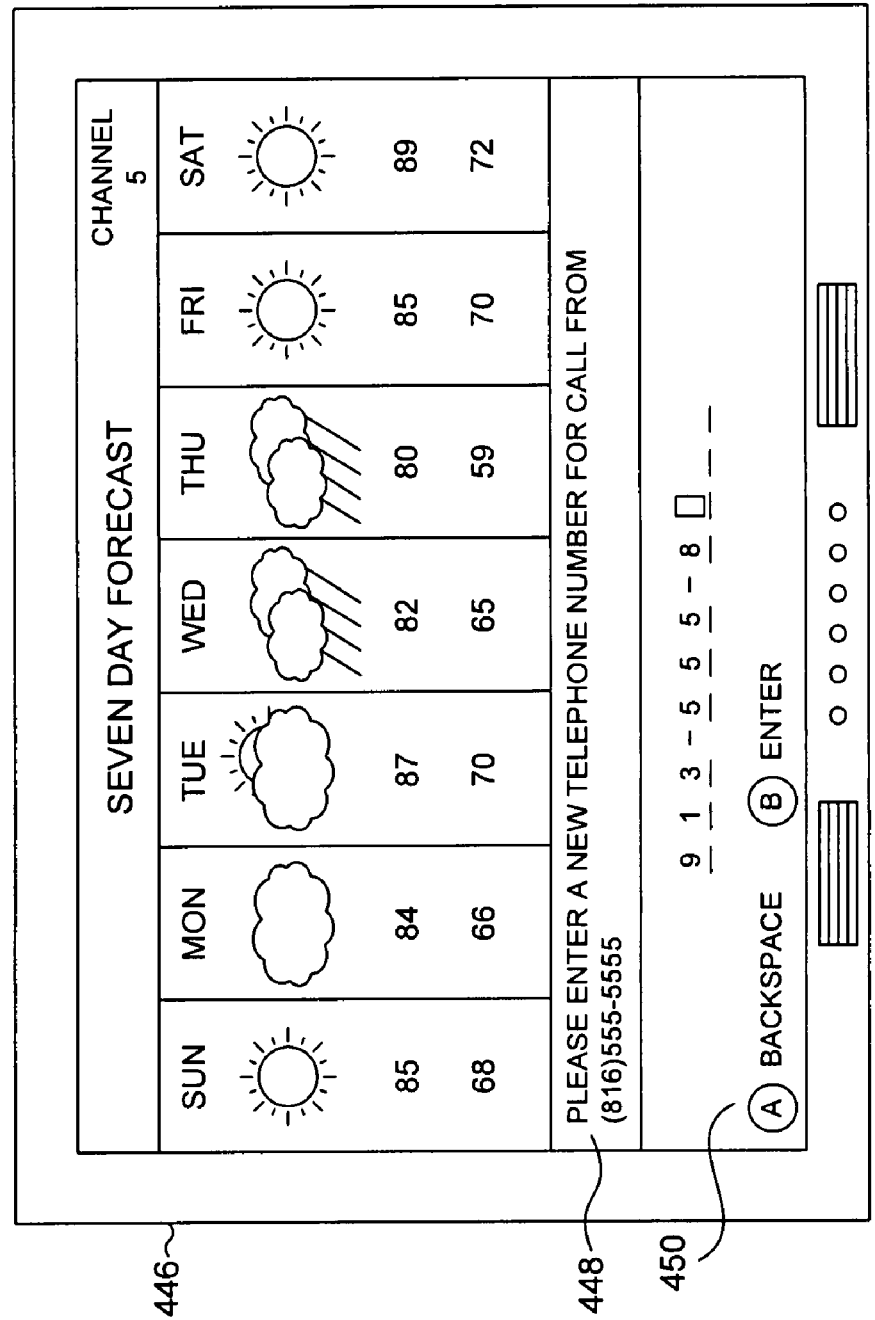
FIG. 8 is a depiction of a display device on which is depicted a video stream indicating an incoming call and providing yet another set of interactive options to a user according to an embodiment of the present invention; and, FIG. 9 is a depiction of a display device on which is depicted a video stream that indicates an incoming call visually and audibly according to an embodiment of the present invention.

In the event that the user chooses option C) (alternate telephone number), then the interactive options 450 are replaced with a new set of options having a series of telephone numbers from which to choose. For example, the user can choose to send the incoming call to a pre-programmed telephone number (options 1-3 in FIG. 7), or to enter a specific telephone number (option 4). If the user selects option 4, then, the interactive options 450 change and the user is prompted to enter a telephone number, as shown in FIG. 8. Typically, the responses to the interactive options are supplied by the user pressing a button on a remote control to the media-receiving device 434 or display device 442.

Figure 9:
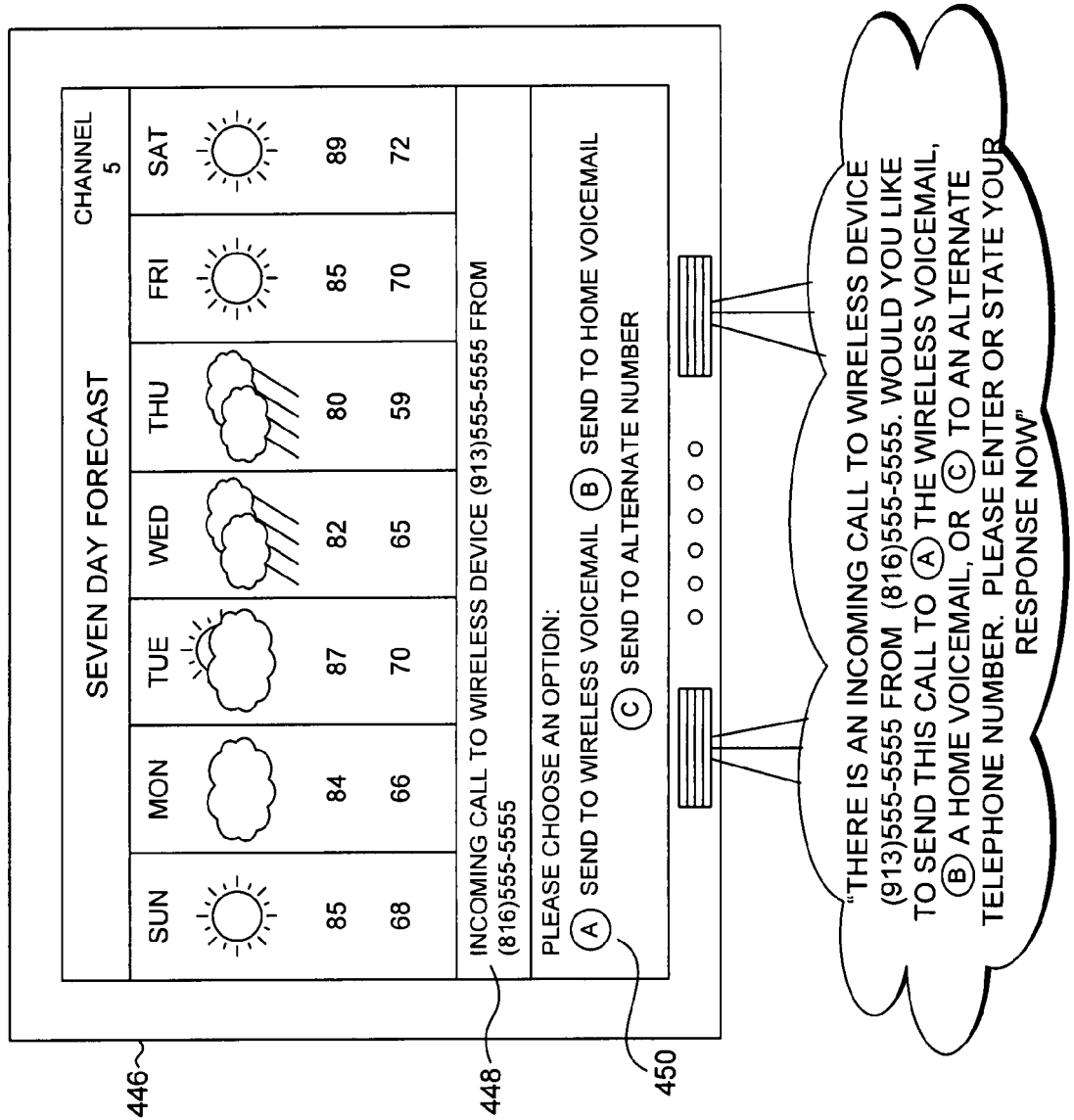

As previously discussed, the incoming call indication and interactive call options, can also be presented audibly. An example of such a configuration is shown in FIG. 9. In this embodiment, the user can also provide an audible response to the audible prompt or the user can enter a response to the audible prompt as previously discussed.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A non-transitory computer-readable media having computer-executable instructions embodied thereon for performing a method of transmitting caller-identification information associated with an incoming call to a wireless mobile device at least from a video-providing component to a display device, the method comprising:
  upon determining a location of the wireless mobile device to be in a home condition, receiving an indication of said incoming call and said associated caller-identification information at said video-providing component;
  inserting said caller-identification information into a video stream at said video-providing component;
  inserting interactive options into the video stream, wherein the interactive options enable a user to respond to the caller-identification information via interaction with a media-receiving device, and wherein at least one of the interactive options represents a prompt to forward the incoming call to one or more alternative telephone numbers;
  communicating said video stream from said video-providing component to the media-receiving device at least partially across a wired pathway, wherein said video stream is capable of being presented on said display device;
  receiving call-handling instructions at said video-providing component from said media-receiving device regarding said incoming call, wherein receiving the call-handling instructions comprises:
    (a) receiving a selection of the prompt to forward the incoming call to one or more alternative telephone numbers;
    (b) upon detecting the selection of the prompt, replacing the interactive options with a pre-programmed series of phone numbers; and
    (c) receiving a selection of at least one of the series of phone numbers or an entry of a particular phone number; and
  transmitting said call handling instructions from said video-providing component to a wireless communications network.

2. The media of claim 1, further comprising removing said caller identification information and interactive options from said video stream upon receipt of said call handling instructions.

3. The media of claim 1, wherein said call handling instructions are sent from said media-receiving device to said video-providing component and then to said wireless communications network by way of at least a portion of a cable network.

* * * * *